United States Patent [19]

Hashimoto et al.

[11] Patent Number: 4,888,190
[45] Date of Patent: Dec. 19, 1989

[54] METHOD OF MANUFACTURING SOY SAUCE

[75] Inventors: Hikotaka Hashimoto; Kunio Kobayashi, both of Chiba, Japan

[73] Assignee: Kikkoman Corporation, Japan

[21] Appl. No.: 173,373

[22] Filed: Mar. 25, 1988

[30] Foreign Application Priority Data

Mar. 25, 1987 [JP] Japan .................................. 62-68942

[51] Int. Cl.⁴ ...................... A23L 1/238; G01N 33/02
[52] U.S. Cl. ..................................... 426/231; 426/589
[58] Field of Search ......................... 426/231, 589, 521

[56] References Cited

U.S. PATENT DOCUMENTS 4,180,591 12/1979 Kazuo et al. ......................... 426/589
4,382,964 5/1983 Noda et al. .......................... 426/589

*Primary Examiner*—George Yeung
*Attorney, Agent, or Firm*—Scherlacher, Mok & Roth

[57] ABSTRACT

A method of manufacturing soy sauce comprises the steps of sampling a portion of a prescribed amount of raw soy sauce and simultaneously analyzing the concentrations of at least two ingredients of the sampled portion of the raw soy sauce, calculating the amount to be added of at least one controlling element in order to adjust the concentrations of the at least two ingredients to target values according to analytic results, and adding the calculated amount of the at least one controlling element to the prescribed amount of raw soy sauce. An apparatus for manufacturing soy sauce comprises a sampling mechanism for sampling a portion of a prescribed amount of raw soy sauce stored in at least one storage tank, and an automatic multiple analyzer for receiving the portion of the prescribed amount of raw soy sauce from the sampling mechanism and simultaneously analyzing the concentrations of at least two ingredients of the sampled portion of the raw soy sauce. The apparatus also includes at least one control tank operatively communicating with the storage tank for supplying at least one controlling element to the raw soy sauce in the storage tank, and a control mechanism for selectively opening and closing control valves coupled between the control tank and the storage tank according to analytic results from the automatic multiple analyzer thereby to add the controlling element to the raw soy sauce in the storage tank to adjust the concentrations of the at least two ingredients of the prescribed amount of raw soy sauce to target values.

11 Claims, 6 Drawing Sheets

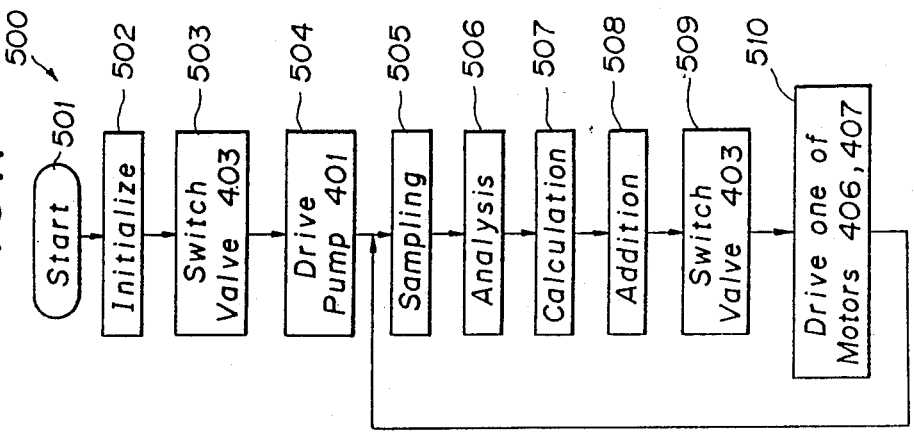
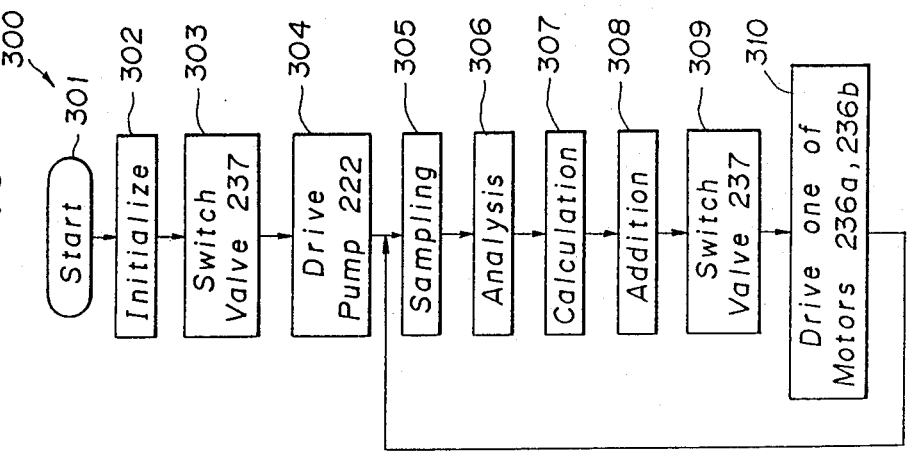
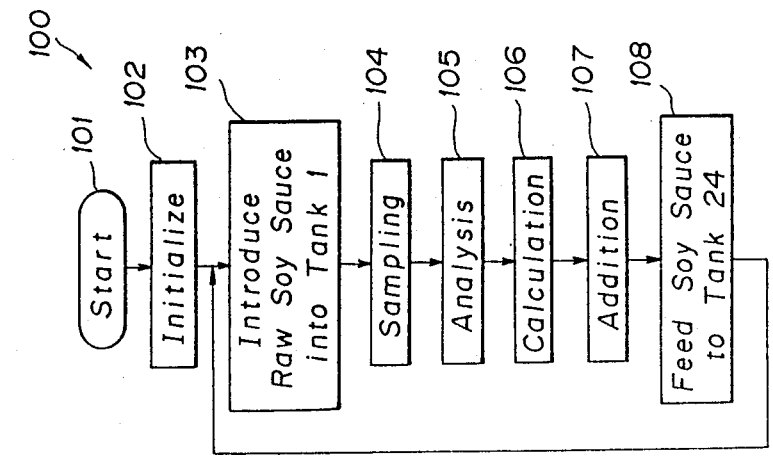

METHOD OF MANUFACTURING SOY SAUCE

BACKGROUND OF THE INVENTION

1. Field of the Invention

The present invention relates to a method of and an apparatus for manufacturing a brewed product, and more particularly to a method of and an apparatus for manufacturing soy sauce (known as "shoyu").

2. Description of the Relevant Art

Heretofore, soy sauce as a brewed product is generally manufactured by a process 600 shown in FIG. 8 of the accompanying drawings under strict quality control. Raw soy sauce 601 produced by pressing moromi mash is analyzed for its ingredients in an adjustment step 602, and controlling elements such as salt, water, and alcohol are added according to the results of the analysis. The raw soy sauce thus adjusted in ingredients is pasteurized in a refining step 603, after which it is decanted in a sediment separation step 604. The decanted soy sauce may be shipped directly as a final object 606 as normal soy sauce. To meet recent various consumer's tastes, a wide variety of soy sauce based products are manufactured such as sauce for meat, soup for Japanese noodle, and soy sauce blended with vinegar and fruit flavor. In order to obtain such various soy sauce based products as a final product 606', the decanted soy sauce from the step 604 is additionally analyzed and adjusted for its ingredients in a step 605. For analyzing the soy sauce for NaCl, nitrogen, and alcohol in the step 605, there have been employed the Moor method, the Kheldahl method, and gas chromatography, respectively.

In the ingredient adjustment steps 602, 605, the raw soy sauce or the decanted soy sauce has been analyzed for NaCl, nitrogen, and alcohol by respective independent analyzing devices through manual operation over a long time. Several hours have been necessary for the analysis of nitrogen in particular. Therefore, the ingredient adjustment steps 602, 605 have been time-consuming, making it difficult to shorten the time required for carrying out the entire process 600 and also to automate the process 600. Tanks for temporarily storing the raw soy sauce and the decanted soy sauce in the ingredient adjustment steps 602, 605 tend to be large in size. As a result, the size of the apparatus used to effect the manufacturing process 600 has been large.

The present invention has been made in an effort to solve the aforesaid problems of the conventional process of manufacturing soy sauce.

SUMMARY OF THE INVENTION

It is an object of the present invention to provide a process of manufacturing soy sauce in a short period of time on an automated basis, the process including shortened and automated steps of analyzing and adjusting ingredients of soy sauce.

Another object of the present invention is to provide an apparatus of a reduced overall size for manufacturing soy sauce, the apparatus including automated and small-size equipment for carrying out steps of analyzing and adjusting ingredients of soy sauce.

To achieve the above objects, there is provided a method of manufacturing soy sauce comprising the steps of: sampling a portion of a prescribed amount of raw soy sauce; analyzing the concentrations of at least two ingredients of the sampled portion of the raw soy sauce; calculating the amount to be added of at least one controlling element in order to adjust the concentrations of the at least two ingredients to target values according to the results of the analysis; adding the calculated amount of the at least one controlling element to the prescribed amount of raw soy sauce; and subsequently processing the raw soy sauce thus adjusted.

There is also provided an apparatus for manufacturing soy sauce comprising: at least one storage tank for storing a prescribed amount of raw soy sauce; a sampling mechanism for sampling a portion of the prescribed amount of raw soy sauce; an automatic multiple analyzer for receiving the portion of the prescribed amount of raw soy sauce from the sampling mechanism and simultaneously analyzing the concentrations of at least two ingredients of the sampled portion of the raw soy sauce; at least one control tank operatively communicating with the storage tank for storing at least one controlling element and supplying the controlling element to the raw soy sauce in the storage tank; control valves operatively coupled between the control tank and the storage tank for controlling the amount of the controlling element to be supplied to the raw soy sauce in the storage tank; control means operatively connected to the automatic multiple analyzer and the control valves for selectively opening and closing the control valves according to analytic results from the automatic multiple analyzer thereby to add the controlling element to the raw soy sauce in the storage tank to adjust the concentrations of the at least two ingredients of the prescribed amount of raw soy sauce to target values; and a mechanism for subsequently processing the raw soy sauce thus adjusted in the storage tank to obtain product soy sauce.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 3 is a flowchart of a processing sequence carried out by a controller in the apparatus of FIG. 1;

FIG. 5 is a flowchart of a processing sequence carried out by a controller in the apparatus shown in FIG. 4;

FIG. 7 is a flowchart of a processing sequence carried out by a controller in the apparatus shown in FIG. 6.

DETAILED DESCRIPTION OF THE PREFERRED EMBODIMENTS

Figure 1:
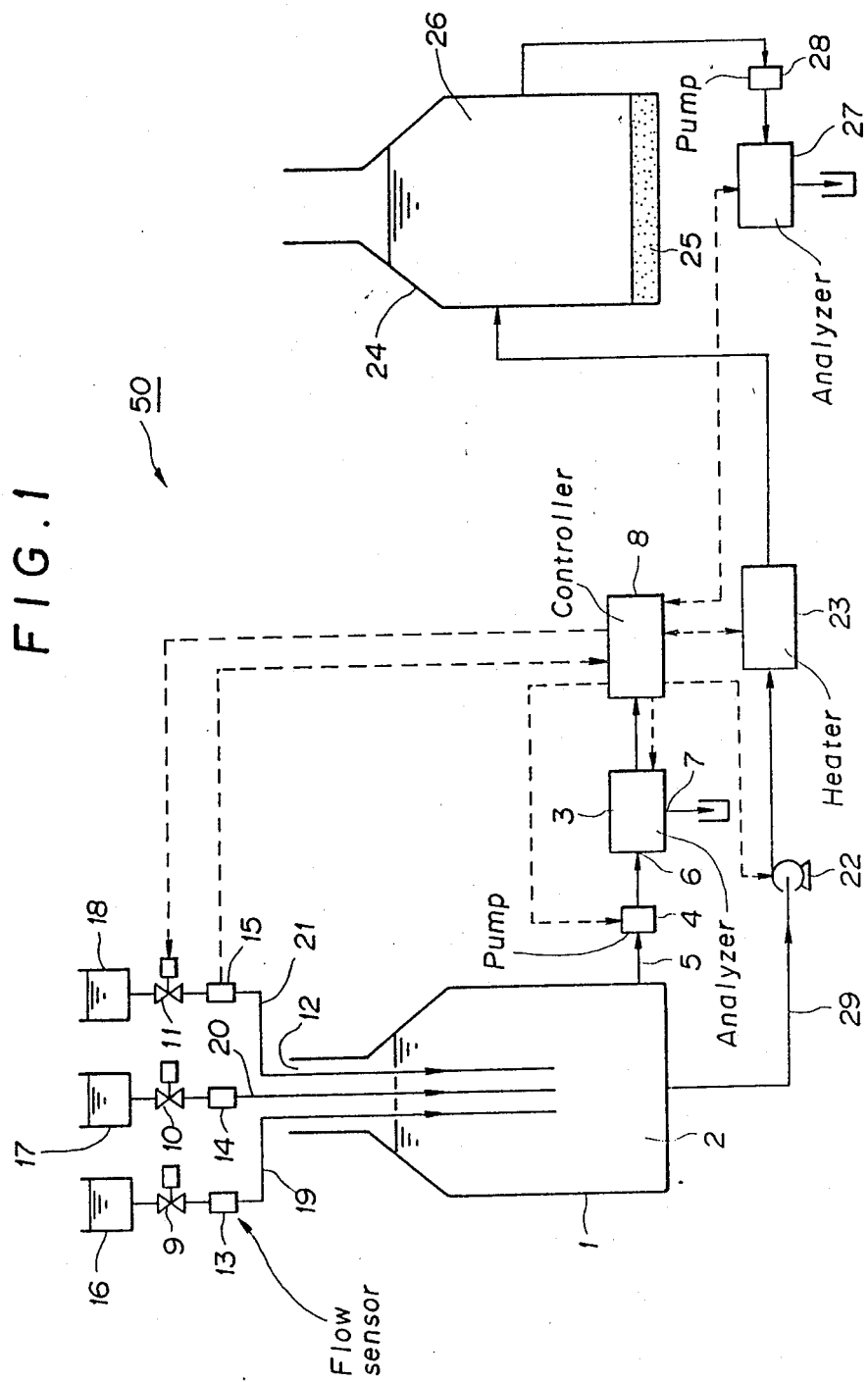
FIG. 1 is a diagram of an apparatus for carrying out a process of manufacturing soy sauce according to a first embodiment of the present invention.

As shown in FIG. 1, an apparatus, generally designated by the reference numeral 50, for carrying out a process of manufacturing soy sauce according to a first embodiment of the present invention, includes a soy sauce tank 1 for temporarily storing a predetermined amount of raw soy sauce 2 which has been produced by pressing moromi mash in a previous step (not shown). In the soy sauce tank 1, the raw soy sauce 2 is subjected to a batch-type soy sauce ingredient analyzing and adjusting procedure.

A portion of the raw soy sauce 2 stored in the tank 1 is introduced into a sample column 6 of an automatic multiple analyzer 3 through a pipe 5 by means of a pump 4. The automatic multiple analyzer 3 has a discharge port 7 for discharging sampled raw soy sauce.

A procedure for analyzing the raw soy sauce with the automatic multiple analyzer 3 will now be described with reference to FIG. 2.

Figure 2:
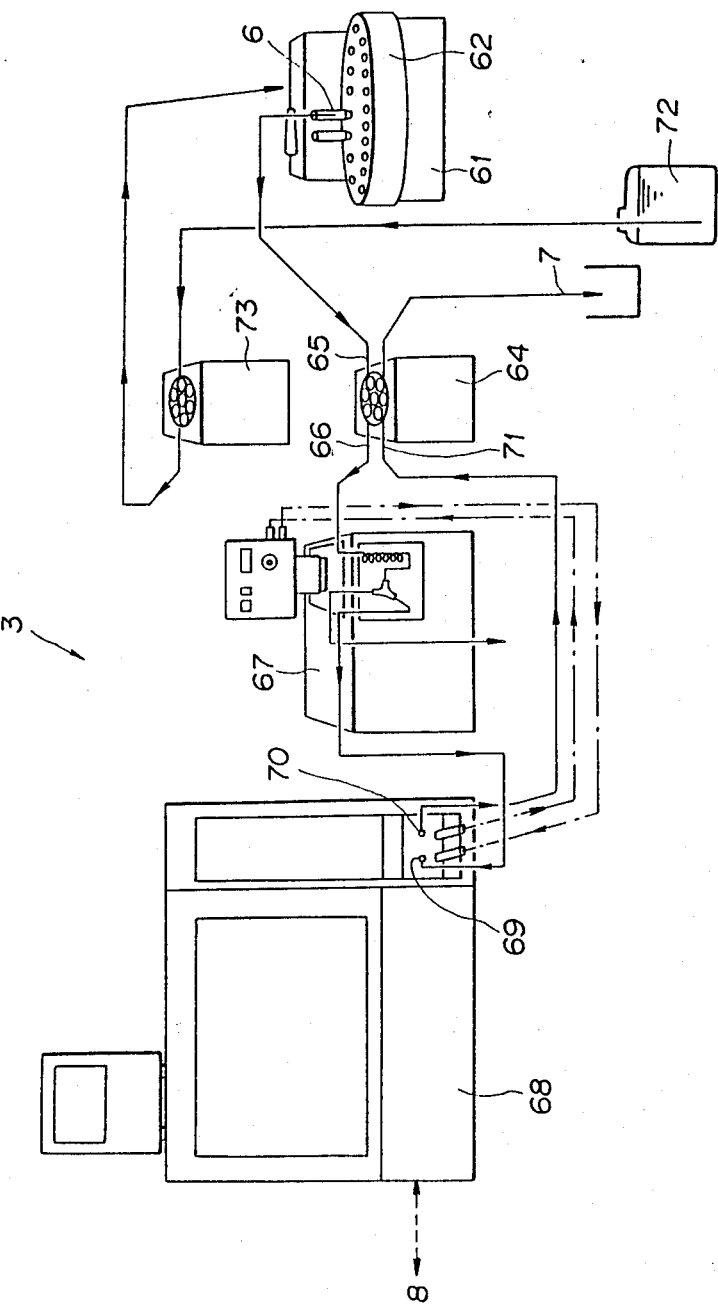
FIG. 2 is a view of a near-infrared analyzer used as an automatic multiple analyzer in the apparatus shown in FIG. 1.

FIG. 2 shows a specific arrangement of the automatic multiple analyzer 3. The analyzer 3 includes a sampler 61 (which may be Sampler Type 4 manufactured by Technicon) having a turntable 62 supporting thereon a plurality of columns 6 in the shape of test tubes. The turntable 62 rotates with a prescribed one of the columns 6 being in an upwardly erected position. When the turntable 62 reaches a given angular position, a sample in the column 6, i.e., raw soy sauce prior to ingredient adjustment is fed to an inlet port 65 of a peristaltic pump 64. The peristaltic pump 64 has an outlet port 66 connected to a sample supply port 69 of a near-infrared analyzer unit 68 through a cooling unit 67 for keeping the sample from the column 6 at a low temperature. The near-infrared analyzer unit 68 may be Infra Alyzer 400LR manufactured by Technicon. The analyzer unit 68 has a sample discharge port 70 coupled to another inlet port 71 of the peristaltic pump 64 for discharging the analyzed sample. The sample discharge port 70 and the inlet port 71 are connected to the discharge port 7. A washing solution 72 is supplied, alternately with the sample, to the column 6 by another peristaltic pump 73. Since the sample and the washing solution are alternately supplied from the column 6 to the analyzer unit 68, therefore, samples will not be mixed with each other.

The sample or raw soy sauce 2 may be supplied directly to the sample supply port 69 of the near-infrared analyzer unit 68 by the pump 4.

As shown in FIG. 1, the apparatus 50 also includes a controller 8 for receiving output signals indicative of analytic results from the analyzer 3 and applying control signals to control valves 9, 10, 11 (described later on) according to the supplied output signals. The controller 8 comprises a microcomputer having an interface circuit, a CPU, a RAM, a ROM, and other circuits. The controller 8 may however be another circuit having the same functions as those of a microcomputer. The ROM in the microcomputer stores target concentration values for NaCl, nitrogen, alcohol (ethanol), sugar (glucose), and sodium glutamate. The nitrogen concentration represents the concentration of amino acid which is a major indicator of taste or flavor. Ethanol is generated by alcoholic fermentation caused by yeast, and glucose is produced by enzymatic decomposition of wheat starch which is a raw material of soy sauce. Sodium glutamate is produced by enzymatic decomposition of raw material protein.

Above the soy sauce tank 1, there are disposed tanks 16, 17, 18 containing brine, water, and alcohol (ethanol), respectively, which serve as manufacturing process controlling elements. The tanks 16, 17, 18 communicate with the soy sauce tank 1 through pipes 19, 20, 21, respectively, having lower ends disposed in the tank 1 through its upper opening 12. The pipes 19, 20, 21 have control valves 9, 10, 11, respectively, and flow sensors 13, 14, 15, respectively. When the control valves 9, 10, 11 are opened, brine, water, and alcohol contained in the tanks 16, 17, 18 are added to the raw soy sauce 2 contained in the tank 1.

In order to adjust the ingredients of the raw soy sauce 2 to the target concentration values, the controller 8 compares the values of output signals from the analyzer 3 with the stored target concentration values in the controller 8, and opens the control valves 9, 10, 11 according to the results of the comparison.

The controller 8 also confirms the amounts supplied of the additives or controlling elements based on detected signals from the flow sensors 13, 14, 15.

The tank 1, the analyzer 3, the tanks 16, 17, 18, the control valves 9, 10, 11, the flow sensors 13, 14, 15, and the controller 8 jointly constitute a device for analyzing and adjusting soy sauce ingredients.

The entire raw soy sauce 2 which has been adjusted in its ingredients by the aforesaid adjusting procedure is fed to a plate heater 23 through a feed line 29 by a pump 22 disposed therein and controlled by the controller 8, and is pasteurized by the plate heater 23 which is controlled by the controller 8. The temperature at which the raw soy sauce 2 is pasteurized by the plate heater 23 is detected by a temperature detector (not shown) and fed back to the controller 8. The pasteurized soy sauce is then fed to a decantation tank 24 in which lees 25 is separated by sedimentation to produce a supernatant liquid 26 that will be a final soy sauce product.

A portion of the supernatant liquid 26 is supplied to another automatic multiple analyzer 27 by a pump 28 controlled by the controller 8. The analyzer 27 is identical to the analyzer 3 shown in FIG. 2, and applies output signals indicative of analytic results to the controller 8.

The ROM in the controller 8 stores target ingredient values of the final product 26 for nitrogen, alcohol, glucose, sodium glutamate, and NaCl. The controller 8 compares the values of output signals from the analyzer 27 with the stored target values in the controller 8 to confirm the quality of the final product 26. After the quality of the final product 26 is confirmed, the entire final product 26 is supplied to a packing line (not shown).

For obtaining another type of soy sauce product as a final product, it is possible to readjust the ingredients of the supernatant liquid 26 with a readjusting device which also comprises the tank 1, the analyzer 3, the tanks 16, 17, 18, the control valves 9, 10, 11, the flow sensors 13, 14, 15, and the controller 8.

Analysis of the raw soy sauce and the product soy sauce with the near-infrared analyzer 3 will hereinafter be compared with a conventional analytic procedure.

The near-infrared analyzer 3 or the near-infrared analyzer unit 68 applies near-infrared radiation to the sample, and checks a light responsive characteristic such as the reflectivity or transmittance of the radiation for thereby analyzing a certain ingredient of the sample. More specifically, for increased accuracy of analytic values, the reflectivity of the infrared radiation is measured at several wavelengths in the near-infrared range, and various ingredient values of the raw soy sauce and the product soy sauce are calculated on the basis of the following regression equations and regression coefficients, where ABS(N) indicates the absorbance, with the unit in each equation being W/V (weight/volume) %:

Regression equations:

Nitrogen = 0.796 − 35.83 · ABS(4) +
143.5 · ABS(7) − 87.60 · ABS(9) −
165.0 · ABS(13) + 28.98 · ABS(20) +
122.2 · ABS(20);

Alcohol = −21.96 − 310.9 · ABS(2) +
380.7 · ABS(4) − 250.5 · ABS(6) +
115.2 · ABS(7) + 71.75 · ABS(19) +
71.20 · ABS(20);

Glucose = −7.981 − 2781.0 · ABS(8) −
81.17 · ABS(11) − 1519.3 · ABS(12) +
4680.1 · ABS(13) − 141.6 · ABS(19)

Sodium Glutamate = −5.501 − 157.1 · ABS(3) +
129.1 · ABS(4) − 65.23 · ABS(5) +
288.9 · ABS(7) − 267.3 · ABS(10) +
98.46 · ABS(14);

NaCl = 3.389 − 492.8 · ABS(3) +
123.1 · ABS(5) + 767.3 · ABS(7) −
390.3 · ABS(10) − 77.32 · ABS(11) +
109.5 · ABS(16).

Regression coefficients:
Nitrogen: 0.9948;
Alcohol: 0.9940;
Glucose: 0.8641;
Sodium Glutamate: 0.9145;
NaCl: 0.9971.

The times required to analyze nitrogen, alcohol, and NaCl in a sample and analyzed values of these ingredients are given for comparison in the following tables 1 and 2 with respect to the inventive process effected by the near-infrared analyzer 3 and conventional processes:

TABLE 1

|  | Nitrogen | Alcohol | NaCl | Time required to analyze one sample |
|---|---|---|---|---|
| Inventive process | (3 min.) | (3 min.) | (3 min.) | 3 min. |
| Conventional processes | 120 min. (Kheldahl) | 15 min. (*) | 10 min. (Moor) | 145 min. (Total time) |

(*Gas chromatography)

TABLE 2

|  | Nitrogen | Alcohol | NaCl |
|---|---|---|---|
| Inventive process | 1.854 | 1.67 | 17.16 |
| Conventional processes | 1.853 | 1.68 | 17.15 |

(Unit: % (W/V))

According to the process of the present invention, as can be understood from the above tables 1 and 2, the soy sauce ingredients can be analyzed with the same accuracy as that of the conventional processes in periods of time which are much shorter than those of the conventional processes.

FIG. 3 shows a schematic flowchart 100 to be executed by the controller 8 of the apparatus 50.

When the apparatus 50 is started, the controller is energized to start the processing from a step 101.

The circuits and variables in the controller 8 are initialized in a step 102.

In a next step 103, a pump (not shown) is actuated for a predetermined interval of time to introduce a prescribed amount of raw soy sauce 2 into the tank 1.

The pump 4 is operated to sample a portion of the raw soy sauce 2 stored in the tank 1 in a step 104, followed by a step 105 in which the ingredients of the raw soy sauce 2 are analyzed by the near-infrared analyzer 3. During the step 105, the controller 8 is kept in a standby condition while consuming time.

In a step 106, output signals indicative of analytic results are sent from the analyzer 3 to the controller 8. The controller 8 compares the values represented by the output signals with the target concentration values stored in the ROM to calculate the amounts of brine, water, and alcohol to be added to the raw soy sauce 2 in the tank 1.

In a step 107, the control valves 9, 10, 11 are opened by the controller 8 for periods of time according to the calculated amounts which are determined in the step 106. The amounts added of brine, water, and alcohol are confirmed by detected signals from the flow sensors 13, 14 15.

Thereafter, the pump 22 is actuated to feed the entire adjusted raw soy sauce 2 from the tank 1 to the settling tank 24 through the plate heater 23 in a step 108.

Control then goes back to the step 103 for analyzing and adjusting another batch of raw soy sauce 2 newly stored in the tank 1.

Analyzing the final product 26 in the tank 24 for its ingredients and discharging the final product 26 from the tank 24 may be carried out while the steps 103 through 107 are being executed.

With the present invention, as described above, the ingredients of the raw soy sauce 2 in the tank 1 are automatically analyzed in a very short period of time by the near-infrared analyzer 3, and are adjusted as required. Therefore, the procedure of adjusting the ingredients is automatically effected in a short interval of time, and thus the entire process of manufacturing soy sauce is automatically carried out in a short period of time.

The capacity or volume of the tank 1 may be relatively small since the procedure of adjusting the ingredients of the raw soy sauce 2 is automatically effected in a short interval of time. Consequently, the equipment needed to adjust the ingredients is automated and reduced in size, and so is the apparatus 50 for manufacturing soy sauce.

Materials or products that can be analyzed by the automatic multiple analyzers 3, 27 are not limited to the raw soy sauce 2 and the pasteurized soy sauce 26. Almost all other varieties of soy sauce such for example as dark-colored soy sauce (known as "koikuchi shoyu"), light-colored soy sauce (known as "usukuchi shoyu"), and clear soy sauce (known as "shiro shoyu") may also be analyzed by the automatic multiple analyzers 3, 27. The ingredients to be analyzed depend on the type of soy sauce. For dark-colored soy sauce and light-colored soy sauce, for instance, NaCl, nitrogen, alcohol, and glucose are analyzed. For flavor-enriched soy sauce or umakuchi shoyu, a chemical condiment such as sodium glutamate is also analyzed in addition to NaCl, nitrogen, alcohol, and glucose.

Figure 4:
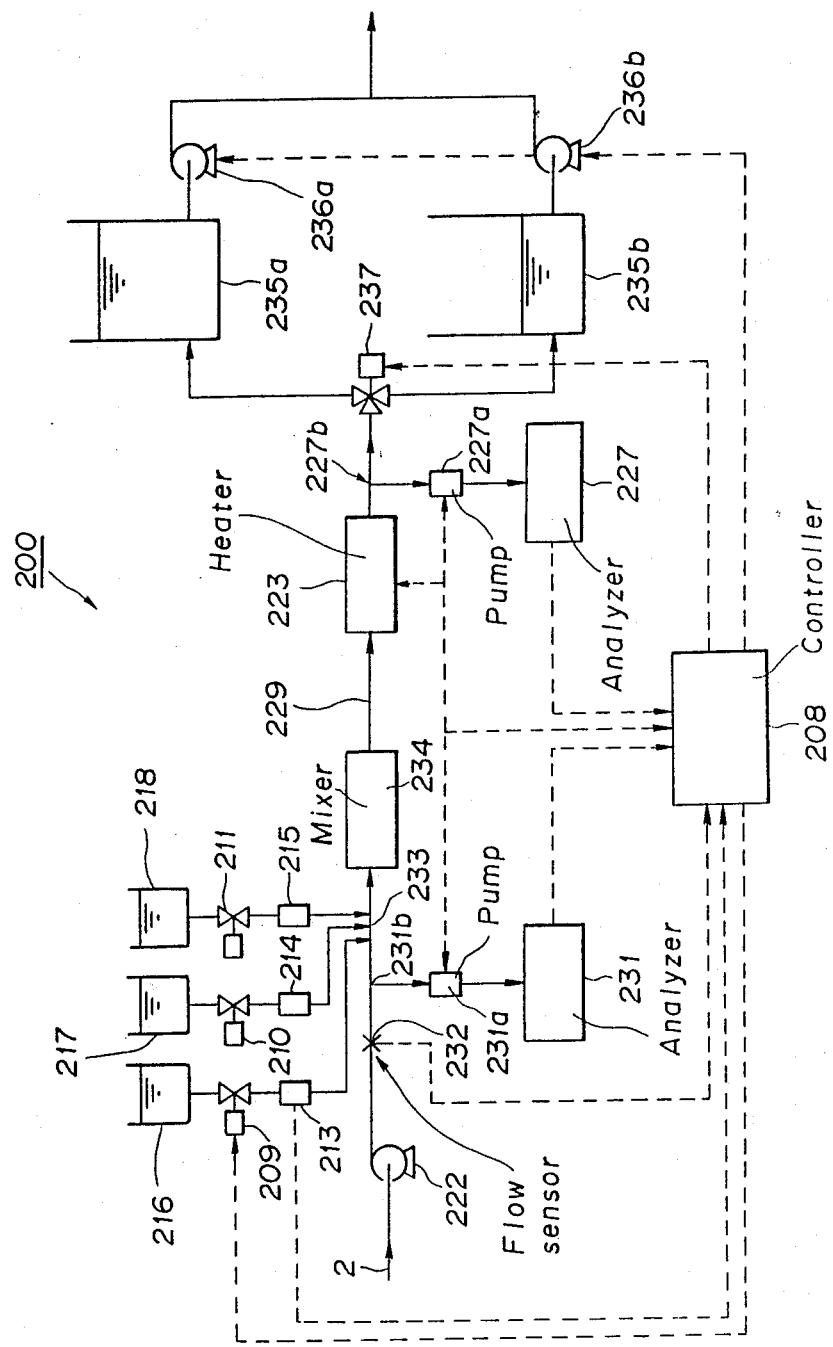
FIG. 4 is a diagram of an apparatus for carrying out a process of manufacturing soy sauce according to a second embodiment of the present invention.

FIG. 4 illustrates an apparatus 200 for manufacturing soy sauce in accordance with a second embodiment of the present invention. The apparatus 200 substantially continuously produces product soy sauce as described below. Raw soy sauce to be adjusted in its ingredients is intermittently sampled at cyclic intervals of time which are determined in view of required analyzing times dependent on the type of the raw soy sauce to be adjusted. A settling tank for separating lees from pasteurized soy sauce by way of sedimentation is omitted from illustration in FIG. 4.

Raw soy sauce 2 produced by pressing moromi mash in a preceding step (not shown) is supplied at a constant rate to a plate heater 223 via a feed line 229 by means of a pump 222, with a mixer 234 being disposed in the feed line 229 upstream of the pump 222. Soy sauce which is pasteurized by the plate heater 223 is supplied selectively to cushioning tanks 235a, 235b by a directional control valve 237. The pasteurized soy sauce in the cushioning tank 235a or 235b is then delivered to a settling tank by a pump 236a or 236b.

Sampling lines leading to near-infrared analyzers 231, 227 are branched from the line 229 at a point 231b between the pump 222 and the mixer 234 and a point 227b between the plate heater 223 and the cushioning tanks 235a, 235b. A portion of the raw soy sauce 2 and a portion of the pasteurized soy sauce are sent to the near-infrared analyzers 231, 227 by the respective pumps 231a, 227a. The near-infrared analyzers 231, 227 are identical in construction to the near-infrared analyzer 3 shown in FIG. 2. A flow sensor 232 is attached to the feed line 229 upstream of the first sampling point 231b.

The apparatus 200 also has a controller 208 for receiving output signals representative of analytic results from the analyzer 231 and applying control signals to control valves 209, 210, 211 (described later on) based on the values of the received output signals. The controller 208 is structurally identical to the controller 8 shown in FIG. 1. The controller 8 stores in its ROM target concentration values of the raw soy sauce 2 for NaCl, nitrogen, alcohol (ethanol), sugar (glucose), and sodium glutamate.

The feed line 229 has a supply region 233 between the first sampling point 231b and the mixer 234, the supply region 233 being held in communication with a brine tank 216, a water tank 217, and an alcohol tank 218 through the control valves 209, 210, 211, respectively, and flow sensors 213, 214, 215, respectively.

In order to adjust the ingredients of the raw soy sauce 2 to the target concentration values, the controller 208 compares the values of the output signals from the analyzer 231 with the stored target concentration values, and opens the control valves 209, 210, 211 for periods of time according to the results of the comparison. The controller 208 also responds to detected signals from the flow sensors 213, 214, 215 to confirm the amounts added of the additives. The flow sensor 232 detects the amount of the raw soy sauce flowing through the feed line 229 and applies a detected signal to the controller 208.

The plate heater 223 is controlled by the heater 208. The temperature at which the raw soy sauce 2 is pasteurized by the plate heater 223 is detected by a temperature sensor (not shown), and fed back to the controller 208. The directional control valve 237 is controlled by the controller 208 to feed the given amount of pasteurized soy sauce in the feed line 229 alternately to one of the cushioning tanks 235a, 235b at a time.

The brine, water, and alcohol are added to the raw soy sauce 2 according to the following sequence.

t0: the valve 237 is switched to one of the cushioning tanks (e.g., 235a);
t1: the raw soy sauce 2 is sampled;
t2: the ingredient analysis is completed;
t3: the signals are processed by the controller 208 to determine the amounts of brine, water, and alcohol to be added;
t4: the additives start being added (by opening the control valves 209, 210, 211);
t5, t5', t5": the addition of the additives is completed (by closing the control valves 209, 210, 211);
t6: the valve 237 is switched to the other cushioning tank (e.g., 235b); and
t7: the pump 236a or 236b is started.

The above sequence will hereinafter be repeated.

The period of time from t1 to t2 is about 3 minutes as described above, and the period of time from t4 to (t5, t5', t5") is several seconds. The periods of time between the other times indicated above are substantially zero. Thus, the period of time from t0 to t7 is substantially equal to the time interval of one analyzing cycle required by the analyzer 231. Therefore, the capacity or volume of the cushioning tanks 235a, 235b may be only large enough to store the amount of raw soy sauce which flows through the feed line 229 within the time period of one analyzing cycle.

It is assumed in the embodiment of FIG. 4 that the quality of the raw soy sauce 2 flowing through the feed line 229 within the time period from t0 to t7 remains constant.

The controller 208, the tanks 216, 217, 218, the near-infrared analyzer 231, and their associated components jointly constitute a device for analyzing and adjusting the ingredients of soy sauce.

The analyzer 227 may sample the soy sauce from the cushioning tanks 235a, 235b rather than from the point 227b on the feed line 229.

FIG. 5 shows a schematic flowchart 300 to be executed by the controller 208 in the apparatus 200.

When the apparatus 200 is started, the controller 208 is energized to start the processing from a step 301.

The circuits and variables in the controller 208 are initialized in a step 302.

In a step 303, the directional control valve 237 is switched to one of the cushioning tanks (e.g., 235a). The pump 222 is started in a next step 304.

In a step 305, the pump 231a is operated to sample a portion of the raw soy sauce 2 in the feed line 229 into the near-infrared analyzer 231. In a next step 306, the ingredients of the raw soy sauce 2 are analyzed by the near-infrared analyzer 231. During the step 306, the controller 208 is kept in a standby condition while consuming time.

Concurrent with the steps 305, 306, a portion of the pasteurized soy sauce may be sampled by starting the motor 227a and analyzed by the near-infrared analyzer 227.

In a step 307, output signals indicative of analytic results are sent from the analyzer 231 to the controller 208. The controller 208 compares the values represented by the output signals with the target concentration values stored in the ROM to calculate the amounts of brine, water, and alcohol to be added to the raw soy sauce 2 which is to be fed to one of the cushioning tanks 235a, 235b within the time period from t0 to t6.

In a step 308, the control valves 209, 210, 211 are opened by the controller 208 for periods of time according to the calculated amounts which are determined in the step 307. The amounts added of brine, water, and alcohol are confirmed by detected signals from the flow sensors 213, 214, 215.

Thereafter, the directional control valve 237 is switched to the other empty cushioning tank (e.g., 235b) in a step 309.

In a step 310, a motor 236a or 236b associated with the cushioning tank 235a or 235b storing the soy sauce 2 which has been adjusted in the ingredients in the above steps 305 through 308 is energized to deliver the soy sauce from the cushioning tank to the settling tank (not shown). When the soy sauce is fully discharged from the cushioning tank, the motor 236a or 236b coupled to the cushioning tank is automatically de-energized by a limit switch (not shown).

After the step 310, control goes back to the step 305 for successively analyzing and adjusting another batch of raw soy sauce 2.

The cyclic time after control has left the step 309 and until it reaches the step 309 again is constant, and can be adjusted by a non-illustrated timer. The cyclic time is equal to the time period from t0 to t7.

According to the apparatus 200 of the second embodiment, the ingredients of the raw soy sauce 2 in the line 229 are automatically analyzed in a very short period of time by the near-infrared analyzer 231, and are adjusted as required. Therefore, the procedure of adjusting the ingredients is automatically effected in a short interval of time, and thus the entire process of manufacturing soy sauce is automatically carried out in a short period of time. Because of the cushioning tanks 235a, 235b, adjusted raw soy sauce is substantially continuously delivered to the settling tank (not shown). Therefore, the process of manufacturing soy sauce is rendered substantially continuous.

The capacity or volume of the cushioning tank 235a or 235b may be small enough to store the amount of raw soy sauce that flows through the feed line 229 within the analyzing time of one cycle of the analyzer 231. Therefore, the equipment needed to adjust the ingredients is reduced in size, and so is the apparatus 200 for manufacturing soy sauce.

Figure 6:
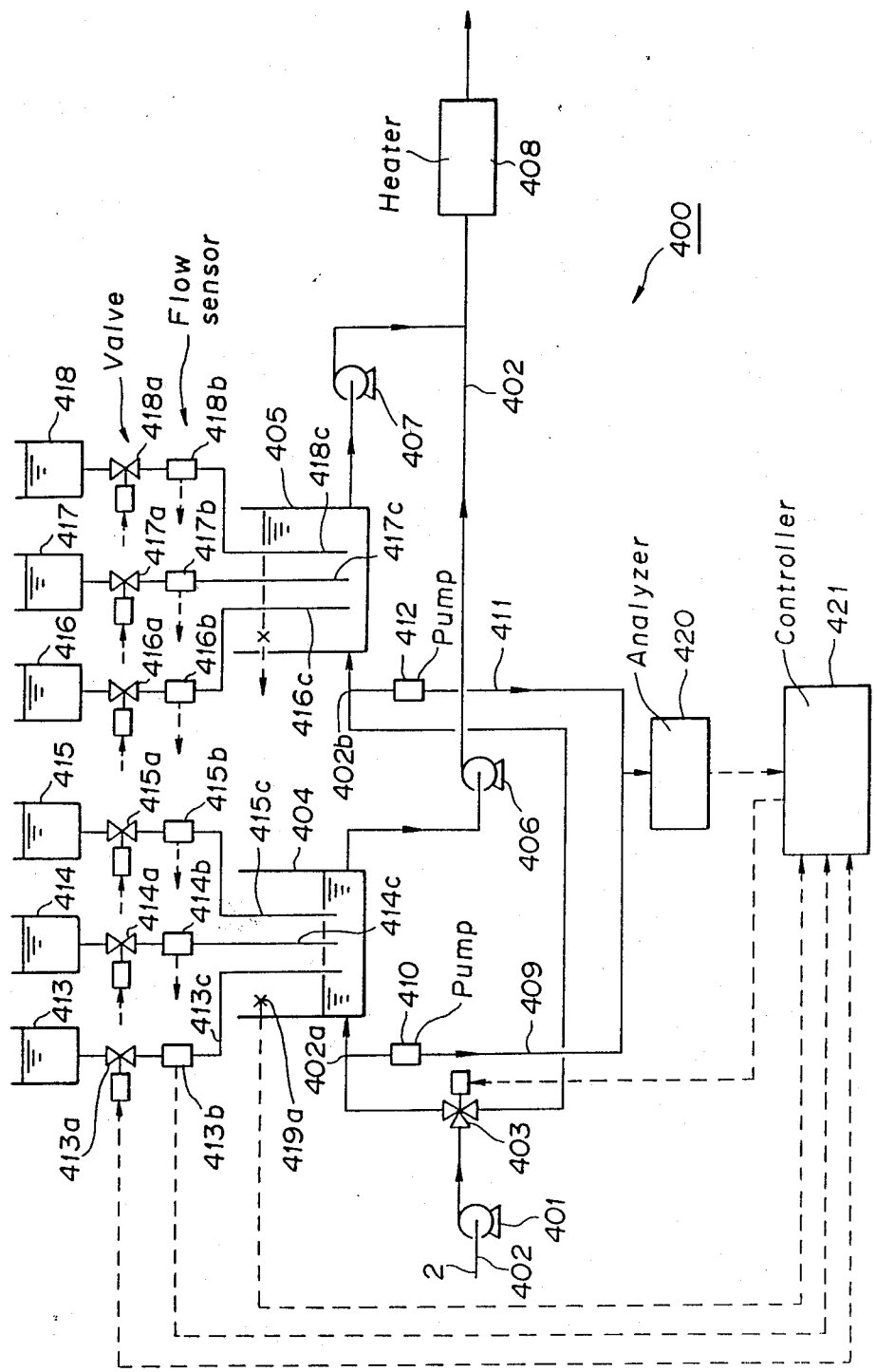
FIG. 6 is a diagram of an apparatus for carrying out a process of manufacturing soy sauce according to a third embodiment of the present invention.
Figure 8:
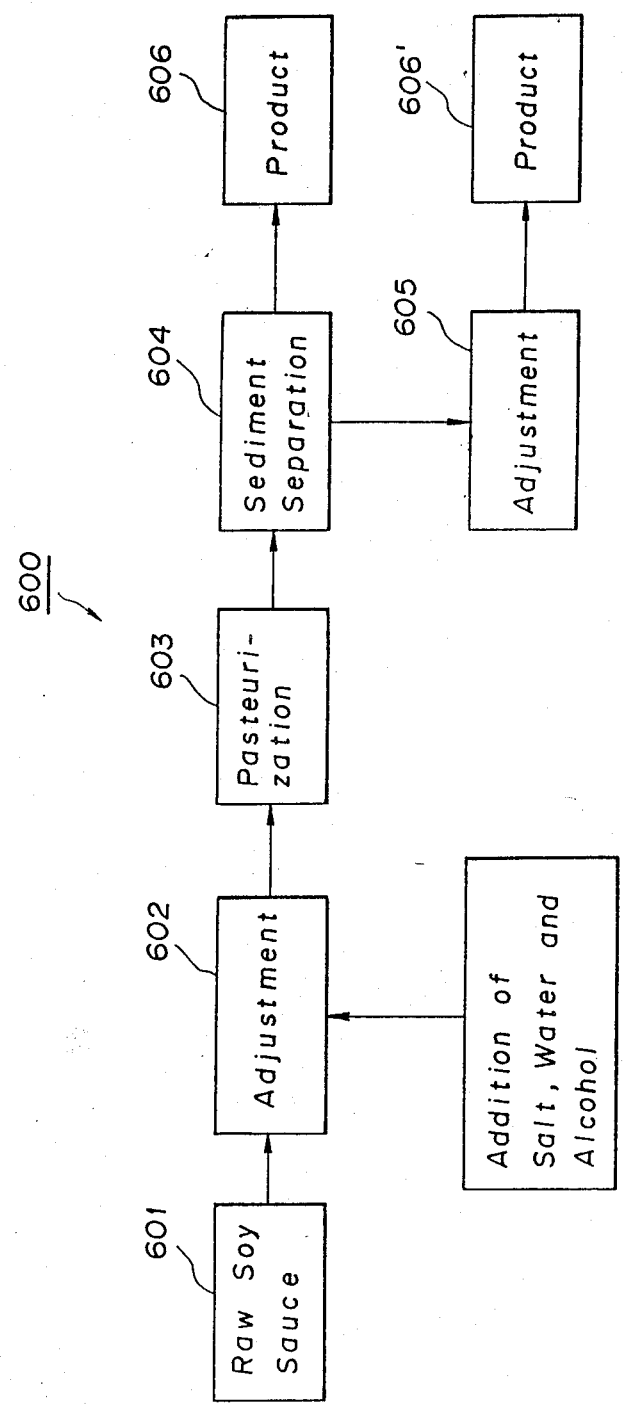
FIG. 8 is a block diagram of a conventional process of manufacturing soy sauce.

FIG. 6 shows an apparatus 400 for manufacturing soy sauce in accordance with a third embodiment of the present invention. The apparatus 400 also substantially continuously produces product soy sauce as described below. A settling tank for separating lees from pasteurized soy sauce by way of sedimentation is omitted from illustration in FIG. 6.

Raw soy sauce 2 produced by pressing moromi mash in a preceding step (not shown) is supplied at a constant rate to a directional control valve 403 in a feed line 402 by means of a pump 401. The raw soy sauce 2 is supplied to one of two cushioning tanks 404, 405 at a time by the directional control valve 403. The raw soy sauce 2 which has been adjusted in its ingredient in the cushioning tank 404 or 405 is then sent via a plate heater 408 to the non-illustrated settling tank by a pump 406 or 407.

A sampling line 409 leading to a near-infrared analyzer 420 and having a pump 410 is branched from a point 402a between the directional control valve 403 and the cushioning tank 404. The analyzer 420 is identical in construction to the analyzer 3 shown in FIG. 2. Another sampling line 411 leading to the near-infrared analyzer 420 and having a pump 412 is branched from a point 402b between the directional control valve 403 and the cushioning tank 405. Portions of the raw soy sauce 2 in the tanks 404, 405 is sent to the near-infrared analyzer 420 by the respective pumps 410, 412.

Tanks 413, 414, 415 for storing brine, water, and alcohol, respectively, are disposed above the cushioning tank 404. The tanks 413, 414, 415 communicate with the cushioning tank 404 through lines 413c, 414c, 415c, respectively, having lower ends disposed in the tank 404 and having control valves 413a, 414a, 415a, respectively, and flow sensors 413b, 414b, 415b, respectively. Similarly, tanks 416, 417, 418 for storing brine, water, and alcohol, respectively, are disposed above the cushioning tank 405. The tanks 416, 417, 418 communicate with the cushioning tank 405 through lines 416c, 417c, 418c, respectively, having lower ends disposed in the tank 405 and having control valves 416a, 417a, 418a, respectively, and flow sensors 416b, 417b, 418b, respectively.

The apparatus 400 also has a controller 421 for receiving output signals representative of analytic results from the analyzer 420 and applying control signals to the control valves 413a, 414a, 415a or 416a, 417a, 418a based on the values of the received output signals. The controller 421 is structurally identical to the controller 8 shown in FIG. 1. The controller 421 stores in its ROM target concentration values of the raw soy sauce 2 for NaCl, nitrogen, alcohol (ethanol), sugar (glucose), and sodium glutamate.

In order to adjust the ingredients of the raw soy sauce 2 supplied to the cushioning tanks 404, 405 to the target concentration values, the controller 421 compares the values of the output signals from the analyzer 420 with the stored target concentration values, and opens the control valves 413a, 414a, 415a or 416a, 417a, 418a for periods of time according to the results of the comparison. The controller 421 also responds to detected signals from the flow sensors 413b, 414b, 415b or 416b, 417b, 418b to confirm the amounts added of the additives.

The brine, water, and alcohol are added to the raw soy sauce 2 according to the following sequence.

t10: the valve 403 is switched to one cushioning tank (e.g., 404);
t11: the raw soy sauce 2 is sampled;
t12: the ingredient analysis is completed;
t13: the signals are processed by the controller 421 to determime the amounts of brine, water, and alcohol to be added;
t14: the additives start being added (by opening the control valves 413a, 414a, 415a or 416a, 417a, 418a);
t15, t15', t15": the addition of the additives is completed (by closing the control valves 413a, 414a, 415a or 416a, 417a, 418a);
t16: the valve 403 is switched to the other cushioning tank (e.g., 405); and
t17: the pump 406 or 407 is started.

The above sequence will hereinafter be repeated.

The period of time from t11 to t12 is about 3 minutes as described above, and the period of time from t14 to (t15, t15', t15") is several seconds. The periods of time between the other times indicated above are substantially zero. Thus, the period of time from t10 to t17 is substantially equal to the time interval of one anlyzig cycle required by the analyzer 420. Therefore, the capacity or volume of the cushioning tanks 404, 405 may be only large enough to store the amount of raw soy sauce which flows through the feed line 402 within the time period of one analyzing cycle.

It is assumed in the embodiment of FIG. 6 that the quality of the raw soy sauce 2 flowing through the feed line 402 within the time period from t10 to t17 remains constant.

The controller 421, the tanks 404, 405, the near-infrared analyzer 420, and their associated components jointly constitute a device for analyzing and adjusting the ingredients of soy sauce.

FIG. 7 shows a schematic flowchart 500 to be executed by the controller 421 in the apparatus 400.

When the apparatus 400 is started, the controller 421 is energized to start the processing from a step 501.

The circuits and variables in the controller 421 are initialized in a step 502.

In a step 503, the directional control valve 403 is switched to one of the cushioning tanks (e.g., 404). The pump 401 is started in a next step 504.

In a step 505, the pump 410 or 412 is operated to sample a portion of the raw soy sauce 2 in the feed line 402 into the near-infrared analyzer 420. In a next step 506, the ingredients of the raw soy sauce 2 are analyzed by the near-infrared analyzer 420. During the step 506, the controller 421 is kept in a standby condition while consuming time.

In a step 507, output signals indicative of analytic results are sent from the analyzer 420 to the controller 421. The controller 421 compares the values represented by the output signals with the target concentration values stored in the ROM to calculate the amounts of brine, water, and alcohol to be added to the raw soy sauce 2 which is to be fed to one of the cushioning tanks 404, 405 within the time period from t10 to t17.

In a step 508, the control valves 413a, 414a, 415a or 416a, 417a, 418a are opened by the controller 421 for periods of time according to the calculated amounts which are determined in the step 507. The amounts added of brine, water, and alcohol are confirmed by detected signals from the flow sensors 413b, 414b, 415b or 416b, 417b, 418b.

Thereafter, the directional control valve 403 is switched to the other empty cushioning tank (e.g., 405) in a step 509.

In a step 510, a motor 406 or 407 associated with the cushioning tank 404 or 405 storing the soy sauce 2 which has been adjusted in the ingredients in the above steps 505 through 508 is energized to deliver the soy sauce from the cushioning tank to the settling tank (not shown). When the soy sauce is fully discharged from the cushioning tank, the motor 406 or 407 coupled to the cushioning tank is automatically de-energized by a limit switch (not shown).

After the step 510, control goes back to the step 505 for successively analyzing and adjusting another batch of raw soy sauce 2.

The cyclic time after control has left the step 509 and until it reaches the step 509 again is constant, and can be adjusted by a non-illustrated timer. The cyclic time is equal to the time period from t10 to t17.

The apparatus 400 of the third embodiment offers the same advantages as those of the apparatus 200 of the second embodiment.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A method of manufacturing soy sauce using an automatic controller comprising the steps of:
    sampling a portion of a predetermined amount of raw soy sauce under control of the automatic controller;
    simultaneously analyzing the concentrations of at least two ingredients of the sampled portion of the raw soy sauce selected from a group consisting of nitrogen, alcohol, glucose, sodium glutimate and salt by determining at least one light responsive characteristic of the sampled portion;
    communicating the determined at least one light responsive characteristic to the automatic controller;
    calculating in the automatic controller an amount to be added of at least two controlling ingredients selected from a group consisting of water, salt and alcohol in order to adjust the concentrations of said at least two analyzed ingredients to target values in response to analytic results from the analyzing step;
    adding under control of the automatic controller the calculated amounts of said at least two controlling ingredients to said predetermined amount of raw soy sauce.

2. A method according to claim 1, wherein said portion of the predetermined amount of raw soy sauce is sampled by introducing the predetermined amount of raw soy sauce into a tank, and sampling said portion of the predetermined amount of raw soy sauce thus introduced.

3. A method according to claim 1, wherein said portion of the predetermined amount of raw soy sauce is sampled by selectively supplying raw soy sauce through a feed line at a predetermined rate to one of at least two cushioning tanks at a time for a given period of time, and sampling said portion of the raw soy sauce from said feed line while the raw soy sauce is being supplied, and wherein said calculated amounts are added by adding the calculated amounts of said at least two controlling ingredients to the raw soy sauce in said feed line.

4. A method according to claim 1, wherein said portion of the predetermined amount of raw soy sauce is sampled by selectively supplying raw soy sauce through a feed line at a predetermined rate to one of at least two cushioning tanks at a time for a given period of time, and sampling said portion of the raw soy sauce from said feed line while the raw soy sauce is being supplied, and wherein said calculated amount is added by adding the calculated amount of said at least two controlling ingredients to the prescribed amount of raw soy sauce supplied to the selected one of the cushioning tanks.

5. A method of manufacturing soy sauce according to claim 1 wherein a time period required to perform the simultaneously analyzing step is not longer than about 3 minutes.

6. A method of manufacturing soy sauce according to claim 1 wherein the simultaneously analyzing step includes the steps of applying near-infrared light to the sampled portion, sensing at least one characteristic of the applied near-infrared light, and determining the concentrations of the at least two ingredients in response to the sensed at least one characteristic of the applied near-infrared light.

7. A method of manufacturing soy sauce using a controller having a computer comprising the steps of:
sampling a portion of a predetermined amount of raw soy sauce under control of the controller;
automatically and simultaneously analyzing concentrations of at least two ingredients of the sampled portion of the raw soy sauce selected from a group consisting of nitrogen, alcohol, glucose, sodium glutimate and salt;
communicating results of the analyzing step to the controller;
calculating with the controller an amount to be added of at least two controlling ingredients selected from a group consisting of water, salt and alcohol to adjust concentrations of said at least two analyzed ingredients to target concentrations in response to the communicated results;
adding under control of the controller the calculated amount of the at least two controlling ingredients to the predetermined amount of ray soy sauce to adjust the at least two analyzed ingredients to the target concentrations;
pasteurizing the raw soy sauce after adding the calculated amount of the at least two controlling ingredients; and
separating lees from the pasteurized soy sauce.

8. A method of manufacturing soy sauce according to claim 7 wherein a plurality of buffer tanks large enough to hold the predetermined amount are used to manufacture the soy sauce and further comprising the step of:
pumping the predetermined amount of soy sauce to each of the buffer tanks in sequence and performing the steps of sampling, analyzing, communicating, calculating and adding while the predetermined amount is being pumped to each different buffer tank.

9. A method of manufacturing soy sauce according to claim 8 further comprising the step of pumping adjusted soy sauce from the buffer tanks in continuous sequence so that a next buffer tank is always available to receive a predetermined amount of soy sauce.

10. A method of manufacturing soy sauce according to claim 7 wherein the step of automatically and simultaneously analyzing uses a near infrared optical analyzer to simultaneously analyze the concentrations of the at least two ingredients of the sampled portion.

11. A method of manufacturing soy sauce comprising the steps of:
sampling a portion of a predetermined amount of raw soy sauce;
automatically and simultaneously analyzing the concentrations of at least two ingredients of the sampled portion of the raw soy sauce selected from a group consisting of nitrogen, alcohol, glucose, sodium glutimate and salt;
automatically calculating an amount to be added of at least two controlling ingredients selected from a group consisting of water, salt and alcohol in order to adjust the concentrations of said at least two analyzed ingredients to target values in response to analytic results from the analyzing step;
adjusting the ray soy sauce by automatically adding the calculated amounts of said at least two controlling ingredients to said predetermined amount of ray soy sauce;
pasteurizing the raw soy sauce thus adjusted; and
separating lees from the pasteurized soy sauce.

* * * * *